United States Patent [19]

Yokota

[11] Patent Number: 4,720,666
[45] Date of Patent: Jan. 19, 1988

[54] ELECTRIC BRAKING APPARATUS FOR BRUSHLESS EXCITATION SYSTEM GENERATOR

[75] Inventor: Hiroshi Yokota, Kobe, Japan

[73] Assignee: Mitsubishi Denki Kabushiki Kaisha, Tokyo, Japan

[21] Appl. No.: 870,013

[22] Filed: Jun. 3, 1986

[51] Int. Cl.⁴ .............................. H02P 3/06
[52] U.S. Cl. ...................... 322/10; 322/59; 318/376
[58] Field of Search ............ 322/10, 11, 59, 86, 322/91; 318/376

[56] References Cited

U.S. PATENT DOCUMENTS 4,129,818  12/1978  Goto et al. ................. 322/10

FOREIGN PATENT DOCUMENTS 246844   5/1966  Austria .
2020737  11/1971  Fed. Rep. of Germany .
2253692   5/1974  Fed. Rep. of Germany .
218506   2/1985  German Democratic Rep .
5784      1982  Japan .

Primary Examiner—R. J. Hickey
Attorney, Agent, or Firm—Burns, Doane, Swecker & Mathis

[57] ABSTRACT

An electric braking apparatus for exerting the electric braking action (dynamic braking action) on a generator, further concretely a generator with a brushless exciter which is so constructed that a rectifying circuit for applying field voltage to the brushless exciter as a braking current to be applied to the generator is normally applied with exciting voltage at least during the running of the generator, thereby enabling the electric braking to be applied even on the generator which uses the brushless exciter and which has hitherto never been applicable of the same.

2 Claims, 4 Drawing Figures

ELECTRIC BRAKING APPARATUS FOR BRUSHLESS EXCITATION SYSTEM GENERATOR

BACKGROUND OF THE INVENTION

1. Field of the Invention

This invention relates to an electric braking apparatus for a generator, and more particularly to an electric braking apparatus for stopping a brushless excitation system generator by exerting thereon the electric braking action (dynamic braking action).

2. Description of the Prior Art

The brushless excitation system generator, in which the field current decreases following the lowering of the speed of rotation thereof, decreases in its internal induced voltage in a square number of rotations and reduces a short-circuit current, whereby the electric braking apparatus has not been applied to the same as ineffective. The present invention has been designed to solve the above problem.

The electric braking apparatus, as well known, short-circuits a generator circuit to flow a short-circuit current of about a rated current, thereby exerting the braking action on the generator by means of a $I^2R$ loss thereof. A generator with a slow speed of rotation in a hydroelectric power station or the like possesses a large rotational energy because of the parts, so that the mechanical brake, which uses brake shoes causes a large quantity of heat, thereby creating a problem in maintenance of the same not only because the braking effect is slow but also because the brake shoes wear out. Hence, the idea of using the electric brake for the generator normally and using the mechanical brake only for the emergency stopping, has been taken in a close-up.

Next, an explanation will be given about an example of the electric braking apparatus of the conventional thyristor excitation system generator with reference to FIG. 1, in which reference numeral 1 designates a generator, 1A designates a field (winding) thereof, 2 designates a circuit breaker for the electric brake, 3 designates a circuit breaker for the generator, 4 designates a main transformer, 5 designates a transformer for meters, 6 designates an exciting transformer, 7 designates an automatic voltage regulator (AVR), 8 designates a firing circuit (GPG: Gate Pulse Generator), 9 designates a thyristor bridge, 10 designates a field circuit breaker, 11 designates a field discharging resistor, 11A designates a contactor closing in association with open (cutoff) of the field circuit breaker 10, 12 designates a contactor for the initial excitation and electric braking action, and 13 designates a diode bridge for the initial excitation and electric braking action.

The circuit breaker 3 for the generator and the field circuit breaker 10 are turned off by a stop instruction to the generator and the contactor 11A is turned on to deenergize a field current in the field 1A at the generator 1, so that, when the existing generator voltage is equal to the residual voltage, the circuit breaker 2 for the electric braking apparatus is closed. Then, the contactor 12 for the electric braking is on so as to excite the field 1A of the generator 1 through diode bridge 13 by flowing in the field 1A a short circuit current of about the rated current of the generator, thereby exerting the electric braking action on the generator 1.

A current flowing during the electric braking action is given in the following equation:

$$I = \frac{SV}{\sqrt{R^2 + (Sxd)^2}} \approx \frac{V}{xd},$$

where

I: a current flowing during the electric braking action,
S: Slip,
V: Generator Voltage,
R: Armature Resistance, and
xd: Synchronous Reactance.

The conventional thyristor excitation system generator ensures an exciting source even when the speed of rotation of generator 1 is lowered, thereby enabling the current expressed in the above equation to continuously flow. Hence, the electric braking effect is kept in effect until the generator stops, whereby such the system has hitherto been adopted.

Meanwhile, an embodiment of an excitation circuit for the conventional brushless excitation system generator is shown in FIG. 2, in which reference numeral 1 designates a generator, 1A designates field winding thereof, 3 designates a circuit breaker for the generator, 4 designates a main transformer, 5 designates a potential transformer, 6 designates an exciting transformer, 7 designates an automatic voltage regulator (AVR), 8 designates a firing circuit (GPG), 9 designates a rectifying circuit comprising a thyristor bridge, 10 designates a field circuit breaker, 14 designates a brushless AC exciter connected directly with the generator 1, 15 designates a rotating rectifier, 16 designates an initial exciting contactor, 17 designates a reverse current blocking diode, 18 designates an adjusting resistor, and 19 designates a battery.

This kind of conventional brushless excitation system generator does not need to use slip rings or brushes thereby being widely used because of the advantage of facilitating the maintenance. However, since the brushless AC exciter 14 is connected directly with the generator 1, the excitation capacity of the exciter 14 lowers as the speed of rotations of the generator 1 decreases, thereby creating the problem in that there is no effect of the electric braking action.

SUMMARY OF THE INVENTION

In the light of the above problems, the present invention has been designed. A main object of the present invention is to provide an electric braking apparatus for the generator, which constitutes a circuit which produces an effect of the electric braking even for the brushless excitation system generator.

Another object of the invention is to provide an electric braking apparatus for the generator, which is so constructed that a rectifying circuit for applying a field current to a brushless exciter at the generator always applies exciting voltage thereto at least while the generator is running, thereby enabling the electric braking apparatus to be applied even to the brushless excitation system generator which has never been applicable of the same.

The above and further objects and features of the invention will more fully be apparent from the following detailed description with accompanying drawings.

DESCRIPTION OF THE PREFERRED EMBODIMENT

Figure 3:
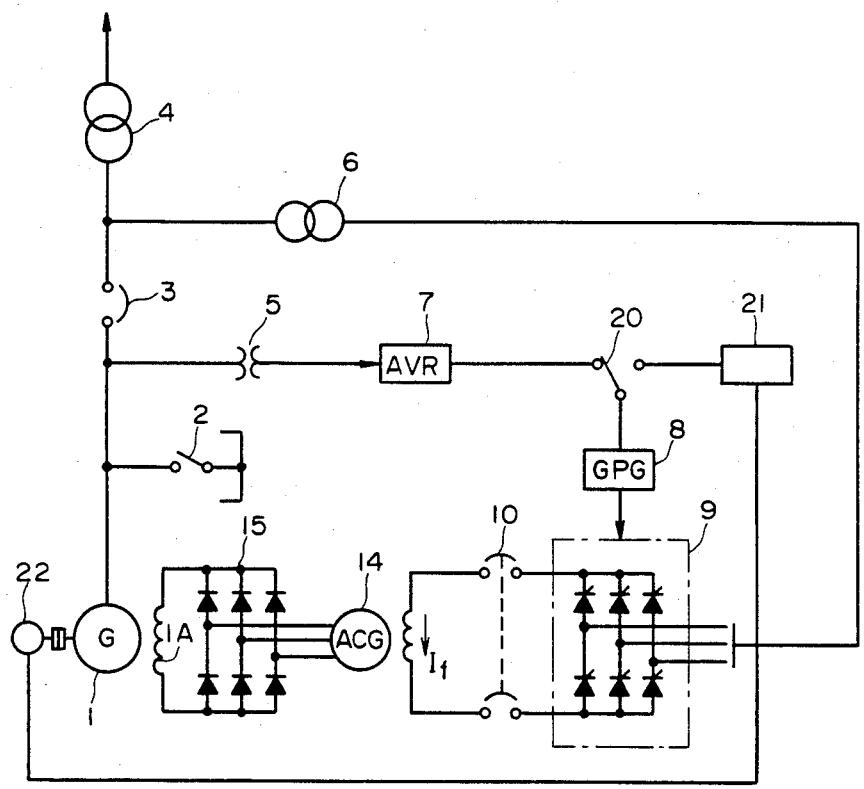
FIG. 3 is a circuit diagram of an embodiment of an electric braking apparatus of the invention for the brushless excitation system generator.

Referring to FIG. 3, reference numeral 1 designates a generator, 1A designates a field (winding) thereof, 2 designates a circuit breaker for the electric brake, 3 designates a generator circuit breaker, 4 designates a main transformer, 5 designates a transformer for meters, 6 designates an exciting transformer, 7 designates an automatic voltage regulator (AVR), 8 designates a firing circuit (GPG: Gate Pulse Generator), 9 designates a rectifying circuit comprising a thyristor bridge, 10 designates a field circuit breaker, 14 designates a brushless AC exciter (ACG) connected directly to generator 1, 15 designates a rotating rectifier, 20 designates a switching circuit for switching generator 1 from the normal operation to the initial excitation or the electric braking action, 21 designates a firing angle control circuit for the initial excitation or the electric braking action, and 22 designates a detecting circuit for rotational number of the generator 1.

Figure 1:
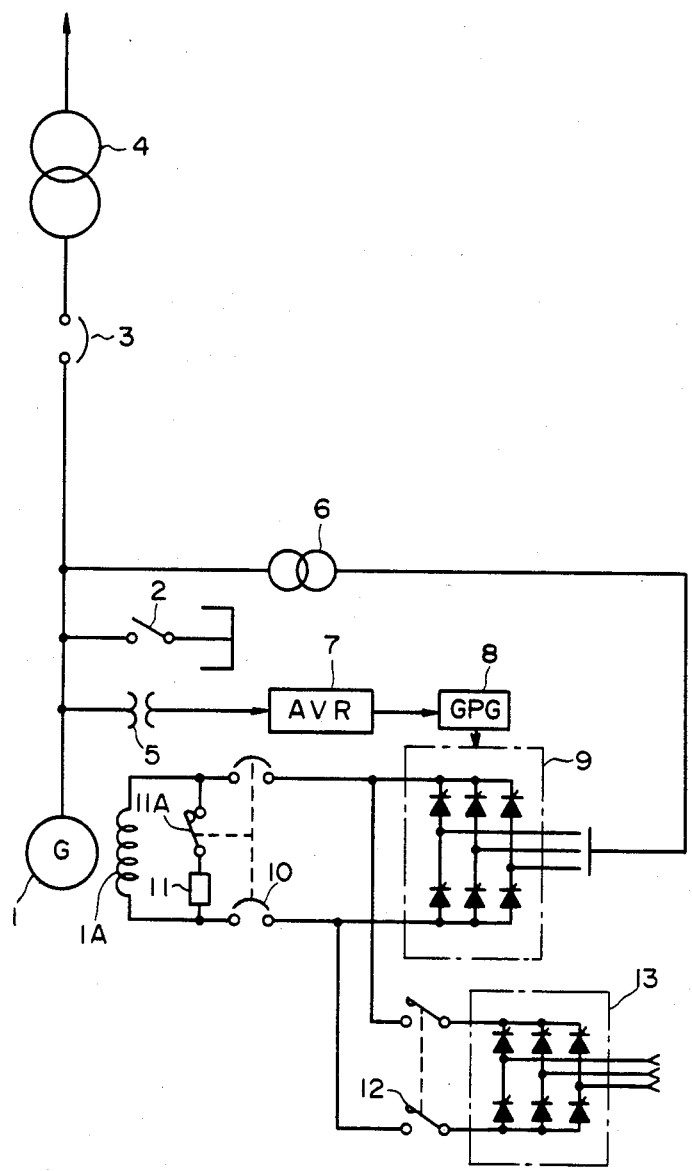
FIG. 1 is a circuit diagram exemplary of an electric braking apparatus for the conventional thyristor excitation system generator.
Figure 2:
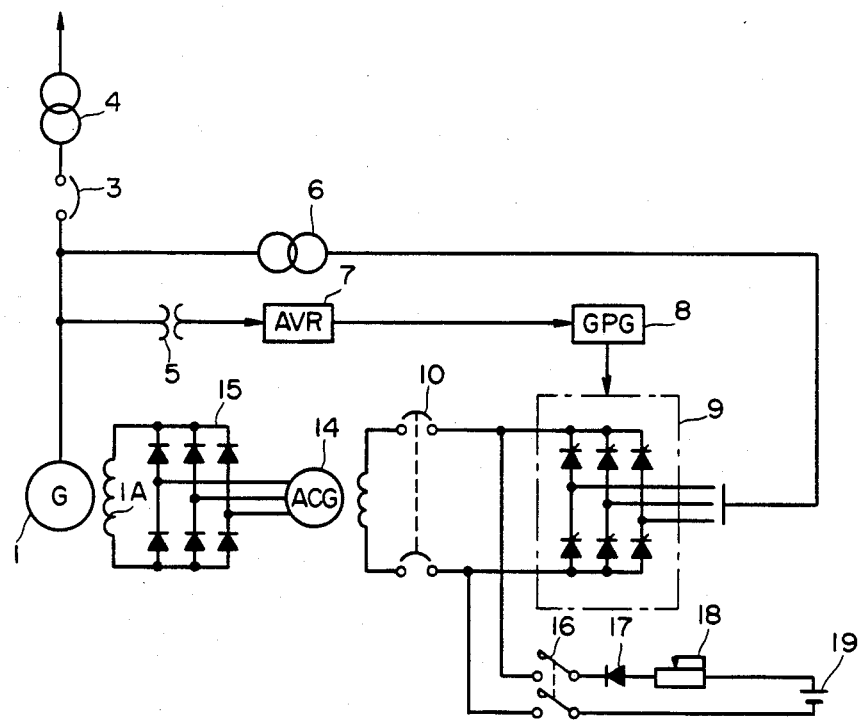
FIG. 2 is a circuit diagram exemplary of an electric braking apparatus for the conventional brushless excitation system generator.

The embodiment of the electric braking apparatus of the invention shown in FIG. 3 is different from the conventional one shown in FIG. 2 in that firstly the circuit breaker 2 for the electric braking is provided so that the exciting transformer 6 is connected between the generator circuit breaker 3 and the main transformer 4 to thereby normally apply voltage from the system side through the main transformer 4 and exciting transformer 6 to the rectifying circuit 9 comprising the thyristor bridge, secondly the initial excitation circuit is omitted to use also the normal excitation circuit for the initial excitation, and thirdly the excitation circuit also serves for the initial excitation or the electric braking action so that the switching circuit 20 and control circuit 21 are added for the firing angle control at that time.

Next, an explanation will be given on the operation of the apparatus of the invention. When the generator 1 is driven up to the rated speed by a power source (not shown), the field circuit breaker 10 is closed to control the rectifying circuit 9 comprising the thyristor bridge, so that the generator voltage has a firing angle suitable for the initial excitation through the firing angle control circuit 21, switching circuit 20, and firing circuit 8, thereby building up voltage. Next, when the voltage, phase and frequency match with those in the system side, the generator circuit breaker 3 is closed and sequentially the switching circuit 20 is connected to the AVR 7 side, thereby starting the power generation.

Next, an explanation will be given on the electric braking action. The generator circuit breaker 3 and field circuit breaker 10 are turned off by the stop instruction and when terminal voltage of generator 1 lowers to the residual voltage, the circuit breaker 2 for the electric braking is on. The switching circuit 20 is switched to the firing angle control circuit 21 from the AVR 7 side, the firing angle control circuit 21 is connected to the firing circuit 8 set to a firing angle suitable for the electric braking action, the field circuit breaker 10 is on, and a short-circuit current flows in the generator 1 through the disconnector 2 for the electric brake, thereby exerting the electric braking action. In this case, since the rectifying circuit 9 comprising the thyristor bridge is always given the excitation source from the system side through the main transformer 4 and exciting transformer 6, even when the generator terminals are short-circuited or the speed of rotations decreases, the excitation source can be supplied, thereby enabling the electric braking effect to be obtained. Such construction, however, lowers in voltage generated by the brushless exciter 14 when the speed of rotations decreases, thereby reducing the electric braking effect. Hence, in the present invention, detecting circuit 22 is added to detect the number of rotations of the generator 1, so that the firing angle control circuit 21 is controlled following reduction in the speed of rotations of generator 1, whereby the field current If is increased in inverse proportion to the number of rotations of the generator 1, thus further promoting the electric braking effect.

Figure 4:
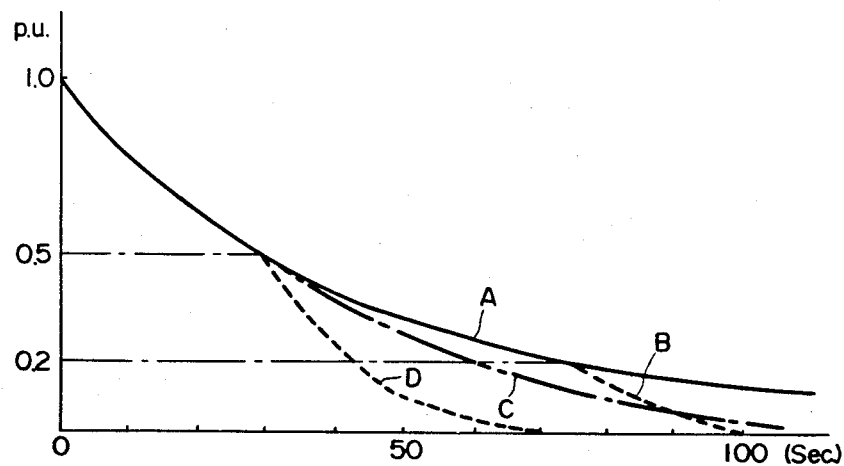
FIG. 4 is a graph showing the stoppage characteristics for explanation of the effect of the electric braking apparatus of the invention.

The effect of the electric braking apparatus of the invention is shown in FIG. 4, in which the axis of ordinate represents the number of rotations (P. U. value) and the axis of abscissa represents the lapse of time (sec.) from the stop instruction. The curve A indicates the natural speed reduction. The curve B indicates exertion of the conventional mechanical braking action on the generator 1 from its 20% speed. The curve C indicates exertion of the electric braking action by use of the electric braking apparatus of the invention on the generator 1 from its 50% speed keeping the exciting current constant. and The curve D indicates the exertion of the electric braking action by use of the electric braking apparatus of the invention on the generator 1 from its 50% speed, with the exciting current If being increased three times at a maximum in inverse proportion to the number of rotations of the generator. Hence, the effect of the invention is confirmed by the above curves shown in FIG. 4.

Alternatively, in the aforesaid embodiment, the rectifying circuit 9 may be connected to a station service power source circuit and the like which can ensure the permanent power supply, thereby being obtainable of the same effect as above-mentioned.

As seen from the above, the present invention can effectively use the electric braking apparatus even for the brushless excitation system generator which has never been applied with the same because of its ineffectiveness.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric braking apparatus for a generator with a brushless exciter, comprising a circuit breaker connected to a terminal of said generator for short-circuiting the output of said generator, a rectifying circuit which supplies a field current to said brushless exciter at least during the running of said generator, a detecting circuit connected to said generator for detecting the number of rotations of said generator, and a firing angle control circuit connected to said detecting circuit and said rectifying circuit for controlling a braking current applied from said rectifying circuit to said generator while said circuit breaker short circuits the output of said generator, said braking current being in inverse proportion to the number of rotations of said generator detected by said detecting circuit, to thereby exert a dynamic braking action on said generator to stop it.

2. An electric braking apparatus for a generator as set forth in claim 1, wherein an exciting voltage is applied to said rectifying circuit from the side of the generator to which power is given.

* * * * *